(12) United States Patent
Jo

(10) Patent No.: US 11,979,061 B2
(45) Date of Patent: May 7, 2024

(54) MOTOR

(71) Applicant: LG INNOTEK CO., LTD., Seoul (KR)

(72) Inventor: Sun Ho Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 329 days.

(21) Appl. No.: 17/593,896

(22) PCT Filed: Mar. 13, 2020

(86) PCT No.: PCT/KR2020/003508
§ 371 (c)(1),
(2) Date: Sep. 27, 2021

(87) PCT Pub. No.: WO2020/197138
PCT Pub. Date: Oct. 1, 2020

(65) Prior Publication Data
US 2022/0190659 A1    Jun. 16, 2022

(30) Foreign Application Priority Data

Mar. 28, 2019 (KR) .................. 10-2019-0035670

(51) Int. Cl.
*H02K 1/28* (2006.01)
*H02K 1/276* (2022.01)
*H02K 21/14* (2006.01)

(52) U.S. Cl.
CPC ............. *H02K 1/2773* (2013.01); *H02K 1/28* (2013.01); *H02K 21/14* (2013.01)

(58) Field of Classification Search
CPC ........ H02K 1/2773; H02K 1/276; H02K 1/28; H02K 21/14
See application file for complete search history.

(56) References Cited

U.S. PATENT DOCUMENTS

| 4,658,167 A * | 4/1987 | Popov ................. H02K 1/2773 |
| | | 310/216.096 |
| 2004/0217667 A1* | 11/2004 | Popov .................... H02K 29/03 |
| | | 310/156.55 |

(Continued)

FOREIGN PATENT DOCUMENTS

| CN | 105226859 A | 1/2016 |
| JP | 2001-231196 A | 8/2001 |

(Continued)

OTHER PUBLICATIONS

International Search Report dated Jun. 23, 2020 in International Application No. PCT/KR2020/003508.

(Continued)

*Primary Examiner* — Tran N Nguyen
*Assistant Examiner* — Masoud Vaziri
(74) *Attorney, Agent, or Firm* — Saliwanchik, Lloyd & Eisenschenk

(57) ABSTRACT

The present invention provides a motor including a shaft, a rotor coupled to the shaft, and a stator disposed outside the rotor, wherein the rotor includes a rotor core, which has a plurality of pockets are radially formed around the shaft, and magnets inserted into the pockets, and the rotor core, which is disposed outside the magnets, includes a plurality of core plates stacked in an axial direction, the core plate includes a center part and a plurality of radial parts connected to the center part, each of the plurality of radial parts includes surfaces forming the pocket and a stepped portion having a step, and the plurality of stepped portions include at least two of a first stepped portion, a second stepped portion, a third stepped portion, and a fourth stepped portion which have different shapes.

20 Claims, 8 Drawing Sheets

(56) References Cited

U.S. PATENT DOCUMENTS

| | | | |
|---|---|---|---|
| 2008/0224558 A1* | 9/2008 | Ionel | H02K 1/2766 |
| | | | 310/156.57 |
| 2009/0127961 A1* | 5/2009 | Pedersen | H02K 1/276 |
| | | | 29/598 |
| 2011/0309707 A1* | 12/2011 | Kato | H02K 1/30 |
| | | | 310/156.54 |
| 2012/0043155 A1* | 2/2012 | Feuerrohr | H02K 1/146 |
| | | | 310/156.01 |
| 2013/0038165 A1* | 2/2013 | Pan | H02K 1/146 |
| | | | 310/156.48 |
| 2014/0084734 A1* | 3/2014 | Ishigami | H02K 1/2773 |
| | | | 29/598 |

FOREIGN PATENT DOCUMENTS

| | | |
|---|---|---|
| JP | 2004-254496 A | 9/2004 |
| JP | 2006-254598 A | 9/2006 |
| KR | 10-2011-0028033 A | 3/2011 |
| KR | 10-2016-0112412 A | 9/2016 |

OTHER PUBLICATIONS

Office Action dated Mar. 7, 2024 in Korean Application No. 10-2019-0035670.

* cited by examiner

MOTOR

CROSS-REFERENCE TO RELATED APPLICATIONS

This application is the U.S. national stage application of International Patent Application No. PCT/KR2020/003508, filed Mar. 13, 2020, which claims the benefit under 35 U.S.C. § 119 of Korean Application No. 10-2019-0035670, filed Mar. 28, 2019, the disclosures of each of which are incorporated herein by reference in their entirety.

TECHNICAL FIELD

The present invention relates to a motor.

BACKGROUND ART

A motor includes a shaft, a rotor, and a stator. A plurality of magnets may be disposed in the rotor. A motor is divided into an inner permanent magnet (IPM) motor in which magnets are inserted into a core of a rotor or a surface permanent magnet (SPM) motor in which magnets are attached to a surface of a core of a rotor.

In IPM motors, there is a spoke-type motor. In the case of the spoke-type motor, magnets of which lengths are greater than widths thereof are radially disposed. The magnets may be disposed in pockets of rotor cores. The spoke-type motor has a feature of a high output density.

In this case, in the spoke-type motor, a cogging torque increases due to a high flux when the spoke-type motor is driven, and thus there is a problem in that the performance of the motor is degraded. Accordingly, a cogging torque of a motor needs to be reduced by improving a shape of a rotor core.

Technical Problem

The present invention is directed to providing a motor capable of reducing a cogging torque by improving a shape of a rotor core.

Technical Solution

One aspect of the present invention provides a motor including a shaft, a rotor coupled to the shaft, and a stator disposed outside the rotor, wherein the rotor includes a rotor core, which has a plurality of pockets are radially formed around the shaft, and magnets inserted into the pockets, the rotor core includes a plurality of core plates stacked in an axial direction, the core plate includes a center part, a plurality of radial parts connected to the center part, each of the plurality of radial parts includes surfaces forming the pocket and a stepped portion having a step, and the plurality of stepped portions include at least two of a first stepped portion, a second stepped portion, a third stepped portion, and a fourth stepped portion which have different shapes.

The number of the pockets may be n, and one core plate may be rotated by 360/n° with respect to another core plate stacked thereon in the axial direction.

The shapes of the stepped portions of the stacked core plates are different or the same in the axial direction.

In the first stepped portion, one side of the radial part and the pocket may overlap in a radial direction, in the second stepped portion, both sides of the radial part and the pocket may overlap in the radial direction, in the third stepped portion, the other side of the radial part and the pocket may overlap in the radial direction, and in the fourth stepped portion, the radial part and the pocket may not overlap in the radial direction.

In the first stepped portion, a protrusion may protrude from one surface, which forms the pocket, of the radial part, and a portion, which faces the protrusion, of the other surface may be recessed.

Protrusions may protrude from one surface and the other surface, which form the pocket, of the radial part.

The protrusions protruding from the one surface and the other surface, which form the pocket, of the radial part may be spaced apart from each other.

In the third stepped portion, one surface, which forms the pocket, of the radial part may be recessed, and a protrusion may protrude from a portion, which faces a recessed position, of the other surface.

In the fourth stepped portion, one surface and the other surface, which form the pocket, of the radial part may be recessed.

The second stepped portion or the fourth stepped portion may be disposed between the first stepped portion and the third stepped portion which are spaced apart from each other in a circumferential direction.

The second stepped portion or the fourth stepped portion may be disposed between the first stepped portion and the third stepped portion which are spaced apart from each other in the axial direction.

Advantageous Effects

According to the present invention, by improving a shape of a pocket of a rotor, a cogging torque can be reduced while the performance with a high magnetic force of a spoke-type motor is maintained, and thus, the performance of the motor can be improved.

According to the present invention, by improving the shape of the pocket of the rotor, an effect of a skew angle can be provided, a cost for the skew angle in manufacturing the rotor can be reduced, and thus, the low-cost and high-efficiency motor can be provided.

MODES OF THE INVENTION

Hereinafter, exemplary embodiments of the present invention will be described in detail with reference to the accompanying drawings.

However, the technical spirit of the present invention is not limited to some embodiments which will be described and may be realized in a variety of different forms, and one or more components of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Figure 1:
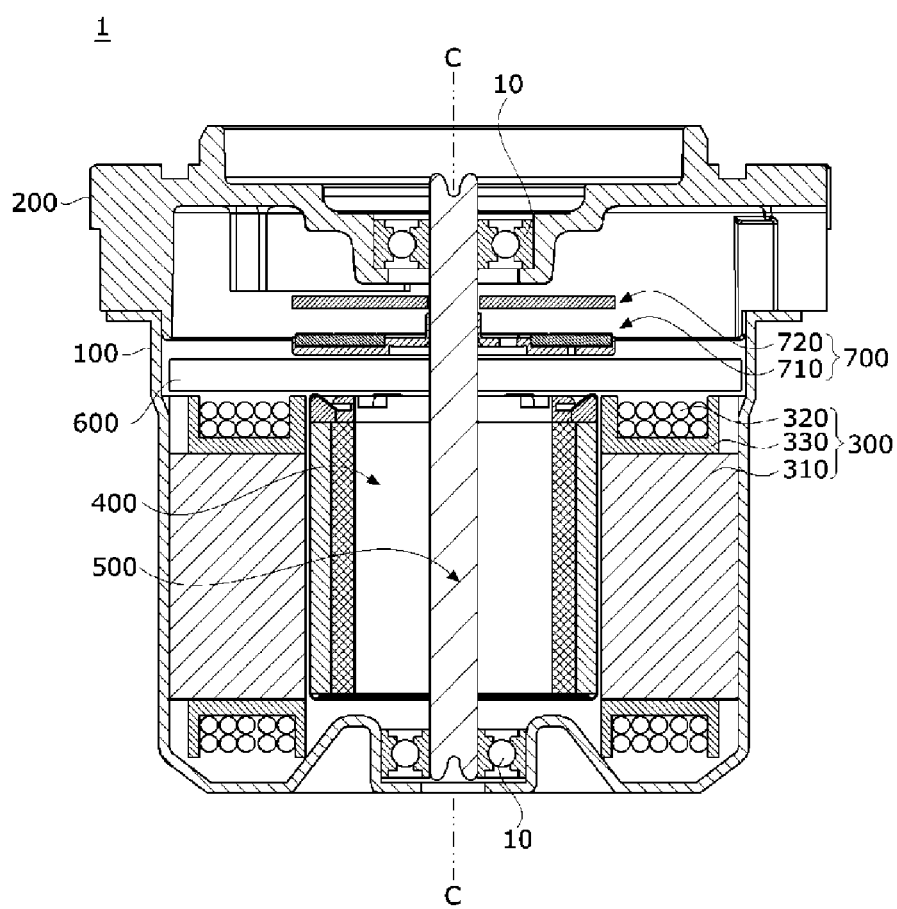
FIG. 1 is a cross-sectional view illustrating a motor according to an embodiment.

FIG. 1 is a cross-sectional view illustrating a motor according to an embodiment.

Referring to FIG. 1, a motor 1 according to the embodiment may include a housing 100 in which an opening is formed at one side, a cover 200 disposed on the housing 100, a stator 300 disposed in the housing 100, a rotor 400 disposed inside the stator 300, a shaft 500 coupled to the rotor 400 and rotated, a busbar 600 disposed above the stator 300, and a sensor part 700 which detects rotation of the shaft 500.

The housing 100 and the cover 200 may form an exterior of the motor 1. The housing 100 and the cover 200 are coupled to form an accommodation space. In this case, the stator 300, the rotor 400, the shaft 500, and the like may be disposed in the accommodation space. In this case, the shaft 500 is rotatably disposed in the accommodation space. Accordingly, the motor 1 may further include bearings 10 disposed in upper and lower portions of the shaft 500.

A shape or material of the housing 100 may be variously changed. For example, the housing 100 may be formed of a metal material which firmly withstands even at high temperature.

The cover 200 is disposed on the housing 100 to cover the housing 100.

The stator 300 may be disposed inside the housing 100. In this case, the stator 300 may be coupled to the housing 100 through a hot press-fitting method. Accordingly, the stator 300 may be supported by an inner circumferential surface of the housing 100.

The stator 300 is disposed outside the rotor 400. The stator 300 may include a stator core 310, a coil 320, and an insulator 330. The insulator 330 is installed on the stator core 310. In this case, the coil 320 is wound around the insulator 330. In this case, the insulator 330 is disposed between the stator core 310 and the coil 320 to insulate the stator core 310 from the coil 320.

The coil 320 which generates a rotating magnetic field may be wound around the stator core 310.

The stator core 310 may be formed in a form in which a plurality of thin steel plates are stacked, but the present invention is not necessarily limited thereto. For example, the stator core 310 may also be formed as one single unit. In addition, the stator core 310 may be formed by a plurality of unit stator cores being disposed in a circumferential direction. The rotor 400 may be disposed inside the stator 300. In addition, the shaft 500 may be coupled to a center part.

The shaft 500 may be disposed in the housing 100 to be rotatable due to the bearings 10. In addition, the shaft 500 may be rotated in conjunction with rotation of the rotor 400.

Figure 2:
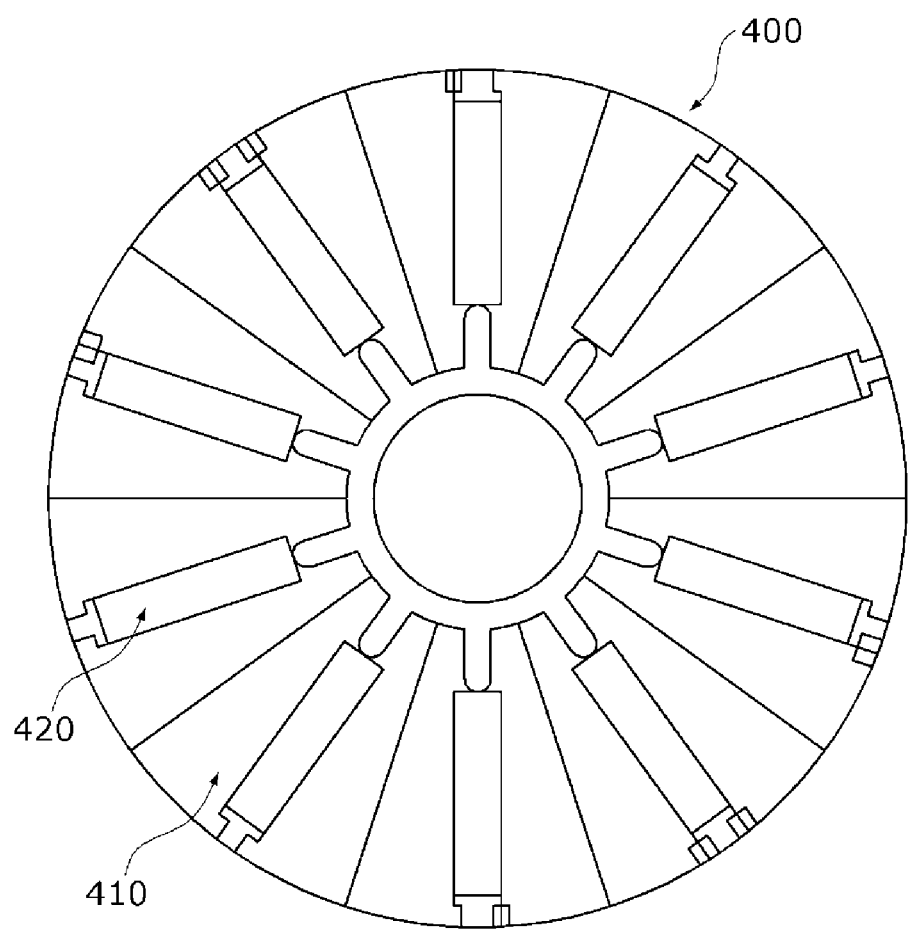
FIG. 2 is a plan view illustrating a rotor illustrated in FIG. 1.

FIG. 2 is a plan view illustrating the rotor illustrated in FIG. 1.

Referring to FIG. 2, the rotor 400 may include a rotor core 410 and magnets 420.

The rotor core 410 is rotatably disposed in a cylindrical space portion formed at a center of the stator 300. In this case, the rotor core 410 may be formed by stacking a plurality of core plates 411 having a disc shape.

A plurality of pockets 410P may be disposed in the rotor core 410.

The pocket 410P may have a shape of which an outer side is open. A length of the pocket 410P in a radial direction may be greater than a width thereof in the circumferential direction. The plurality of pockets 410P may be disposed to be spaced apart from each other by a predetermined distance in the circumferential direction of the rotor core 410. In addition, the plurality of pockets 410P may be disposed in the radial direction about a center of the rotor core 410. The magnets 420 are disposed in the pockets 410P.

In this case, the magnet 420 includes a rare-earth element. The magnet 420 may be a rare-earth magnet (for example, a NdFeB (neodymium) magnet, or a SmCo (samarium cobalt) magnet).

Figure 3:
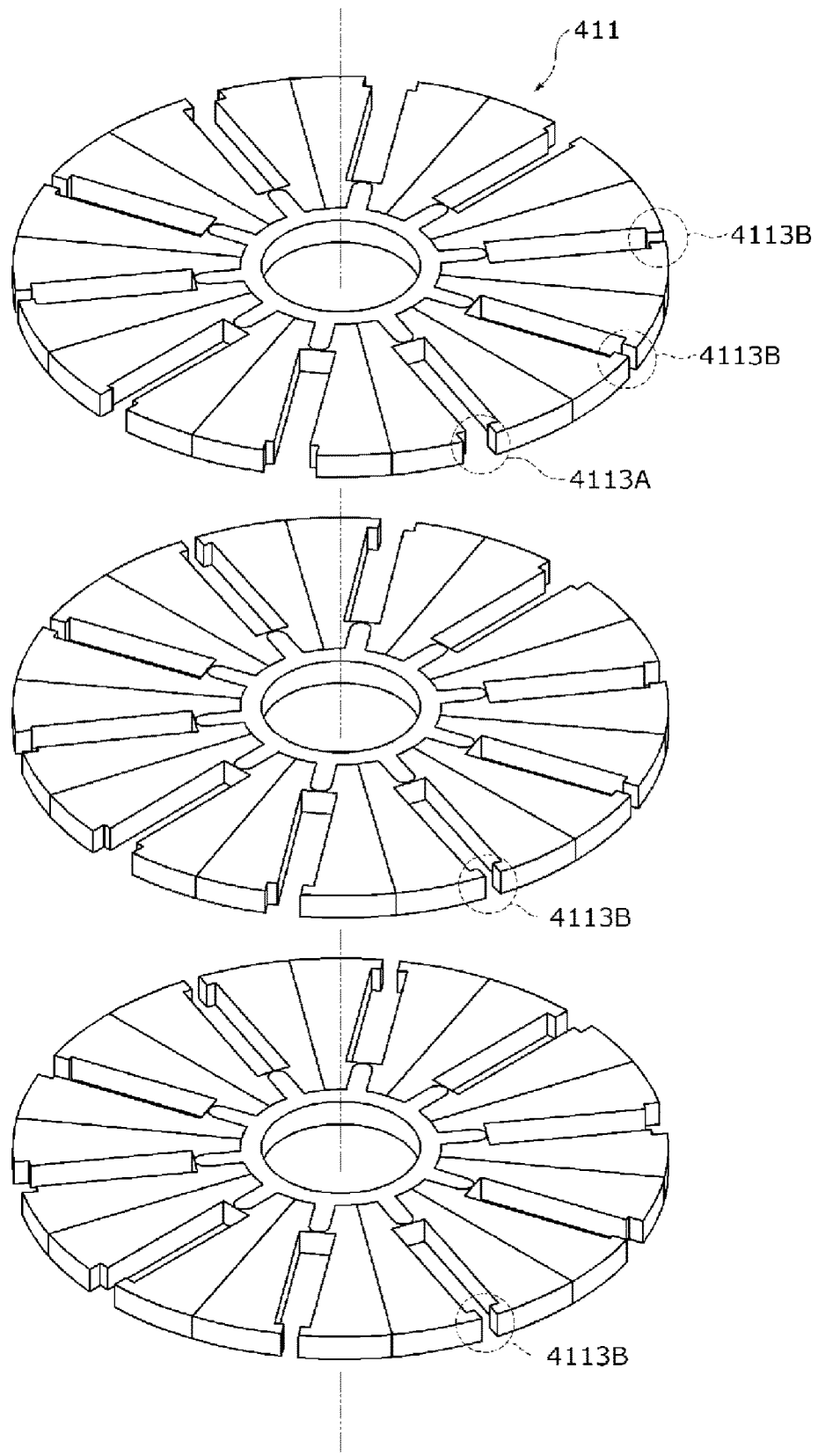
FIG. 3 is an exploded perspective view illustrating a state in which core plates of a rotor core illustrated in FIG. 2 are stacked.
Figure 4:
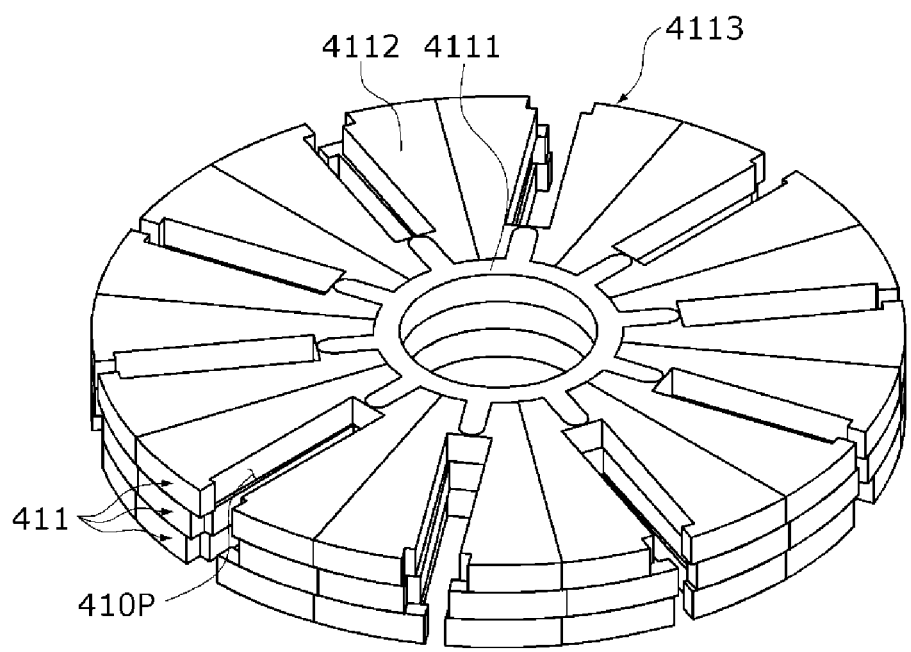
FIG. 4 is a perspective view illustrating a state in which the core plates of the rotor core illustrated in FIG. 3 are stacked.

FIG. 3 is an exploded perspective view illustrating a state in which the core plates of the rotor core illustrated in FIG. 2 are stacked, and FIG. 4 is a perspective view illustrating a state in which the core plates of the rotor core illustrated in FIG. 3 are stacked.

Referring to FIG. 3, in the rotor core 410, the plurality of core plates 411 are formed to be stacked in an axial direction of the shaft 500. In this case, the core plates 411 are formed of a metal material so that a magnetic flux path is formed between the magnets 420. In this case, a cylindrical non-magnetic member may be disposed outside the rotor core 410. In this case, any material which blocks a magnetic force is used as a material of the non-magnetic member without limitation.

The core plates 411 include center parts 4111 and a plurality of radial parts 4112 coupled to the center parts

4111. In this case, the center part and the plurality of radial parts 4112 may be formed to be integrated or to have coupling structures.

A through hole into which the shaft 500 is inserted is formed in the center parts 4111. In this case, the through hole may be formed in a long hollow shape. Inner walls, which form the through hole, of the center parts 4111 may be a planation surface, and knurling shapes may be formed in the inner walls in order to increase a fixing force with respect to the shaft 500 when the through hole is coupled to the shaft 500.

The plurality of radial parts 4112 are connected to an outer side of the center part 4111 in a radial shape. Each of the plurality of radial parts 4112 includes the pocket 410P. In this case, each of the plurality of radial parts 4112 includes surfaces forming the pocket 410P and a stepped portion 4113 forming a step. The stepped portion 4113 is disposed further outward than the pocket 410P in the radial direction, and when the magnet 220 is disposed in the pocket 410P, the stepped portion 4113 may be disposed outside the magnet 220 to inhibit the magnet 220 from being separated from the pocket 410P. In this case, a mold may be injected between the stepped portions 4113.

The stepped portions 4113 of the plurality of radial parts 4112 of the core plate 411 may have various shapes. More specifically, the plurality of radial parts 4112 may include the stepped portions 4113 having different shapes, and in this case, the stepped portions 4113 may include a first stepped portion 4113A, a second stepped portion 4113B, a third stepped portion 4113C, and a fourth stepped portion 4113D which have different shapes.

Figure 5:
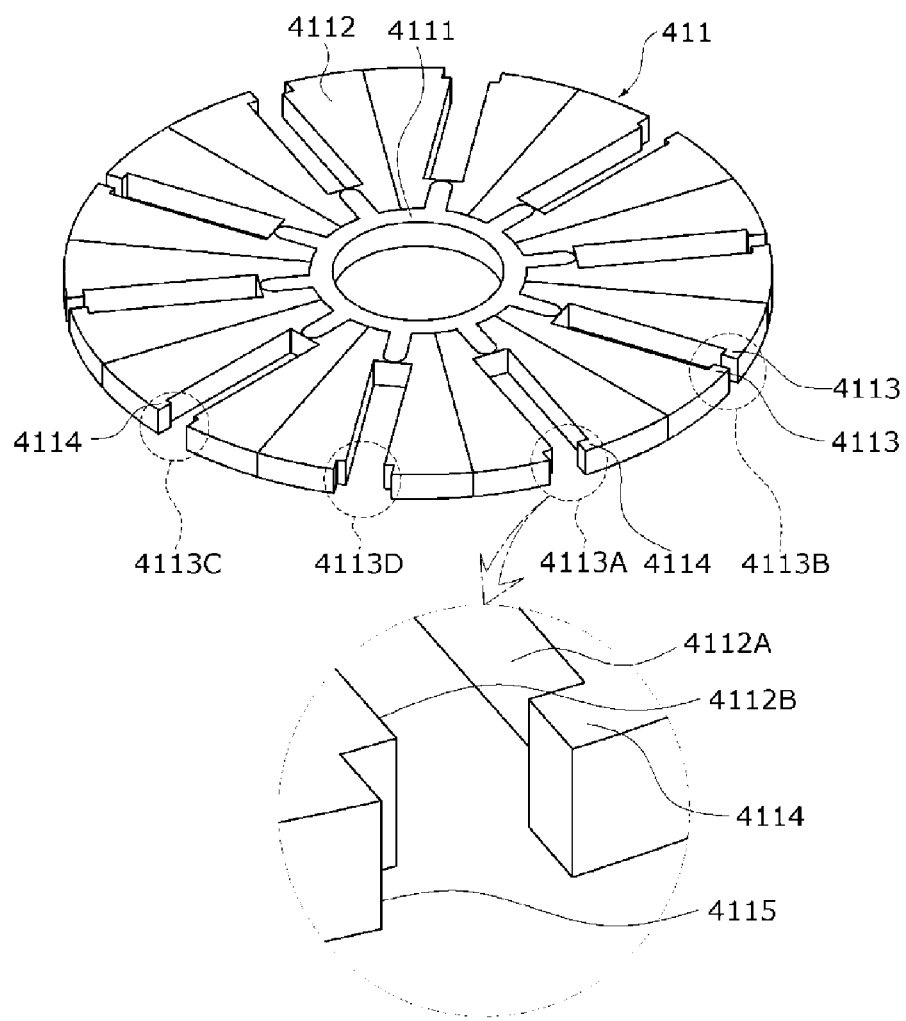
FIG. 5 is a perspective view illustrating the core plate illustrated in FIG. 3.
Figure 6:
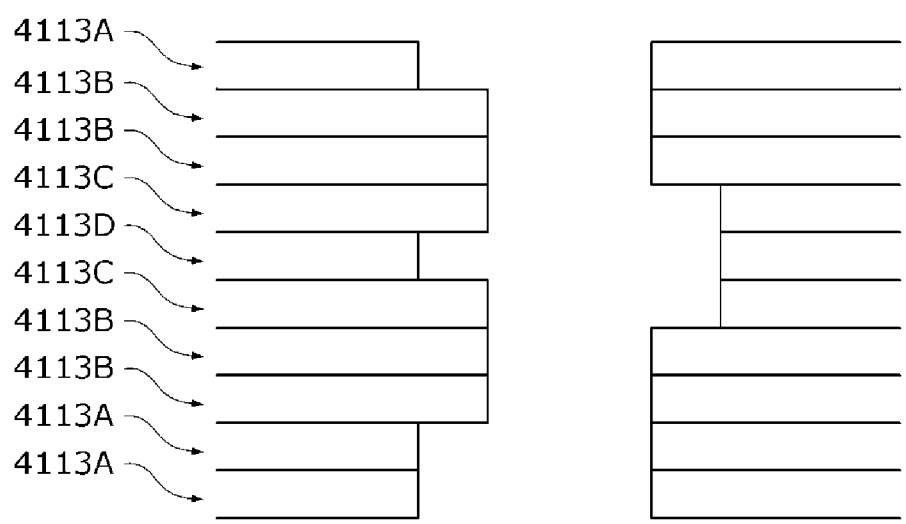
FIG. 6 is an enlarged side view illustrating a stepped portion around a pocket.

FIG. 5 is a perspective view illustrating the core plate, and FIG. 6 is an enlarged side view illustrating the stepped portion around the pocket.

Referring to FIGS. 5 and 6, in the first stepped portion 4113A, the radial part 4112 disposed at one side overlaps the pocket 410P in the radial direction. In this case, in the first stepped portion 4113A, a protrusion 4114 protrudes from a one surface 4112A, which forms the pocket 410P, of the radial part 4112, and a portion, which faces the protrusion 4114, of the other surface 4112B is recessed to form a recessed step 4115.

In the second stepped portion 4113B, radial parts 4112 at both sides overlap the pocket 410P in the radial direction. In this case, in the second stepped portion 4113B, protrusions 4114 may protrude from one surface and the other surface, which form the pocket 410P, of the radial part 4112.

In the third stepped portion 4113C, the radial part 4112 disposed at the other side overlaps the pocket 410P in the radial direction. In this case, in the third stepped portion 4113C, one surface 4112A, which forms the pocket 410P, of the radial part 4112 may be recessed to form a recessed step 4115, and a protrusion 4114 may protrude from a portion, which faces the recessed position, of the other surface 4112B.

In the fourth stepped portion 4113D, the radial part 4112 does not overlap the pocket 410P in the radial direction. In this case, in the fourth stepped portion 4113D, a one surface 4112A and the other surface 4112B, which form the pocket 410P, of the radial part 4112 may be recessed.

One core plate 411 may include at least two of the first to fourth stepped portions 4113A, 4113B, 4113C, and 4113D. One core plate 411 may include all of the first to fourth stepped portions 4113A, 4113B, 4113C, and 4113D. In addition, the first to fourth stepped portions 4113A, 4113B, 4113C, and 4113D may be alternately disposed in one core plate 411 in the circumferential direction. In this case, the number and an order of the first to fourth stepped portions 4113A, 4113B, 4113C, and 4113D are not limited. However, the first stepped portion 4113A and the third stepped portion 4113C are disposed with the second stepped portion 4113C or the fourth stepped portion 4113D interposed therebetween in the circumferential direction. That is, the first stepped portion 4113A and the third stepped portion 4113C are not disposed adjacent to each other in the circumferential direction.

Meanwhile, the first to fourth stepped portions 4113A, 4113B, 4113C, and 4113D may be repeatedly disposed in a predetermined order. That is, the first to fourth stepped portions 4113A, 4113B, 4113C, and 4113D may be symmetrically disposed in the core plate 411. In this case, a symmetrical structure of the first to fourth stepped portions 4113A, 4113B, 4113C, and 4113D may be changed according to the number of poles and slots of the motor.

FIGS. 7A-7D show views illustrating vibration directions according to the number of poles and slots of a motor.

Figure 7A:
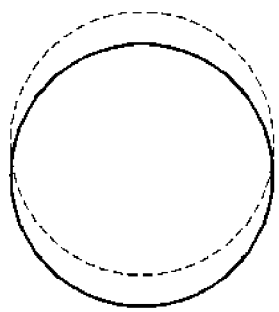
FIGS. 7A-7D show views illustrating vibration directions according to the number of poles and slots of the motor.
Figure 7B:
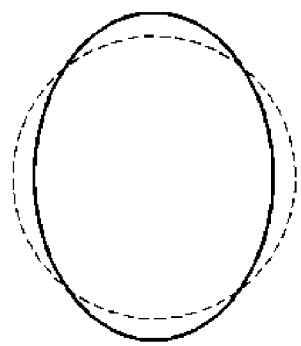
Figure 7C:
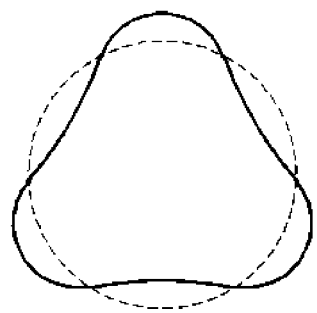
Figure 7D:
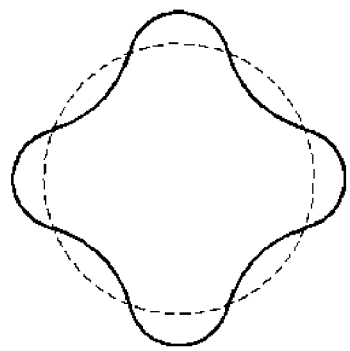

Referring to FIGS. 7A-7D, FIG. 7A shows a vibration direction of an 8-pole 9-slot (8p9s) motor, FIG. 7B shows a vibration direction of a 10-pole 12-slot (10p12s) motor, FIG. 7C shows a vibration direction of a 6-pole 9-slot (6p9s) motor, and FIG. 7D shows a vibration direction of an 8-pole 12-slot (8p12s) motor.

In the case of the 10p12s motor, since the vibration direction of the motor is formed to be inclined in two directions in an oval shape as in FIG. 7B, the first to fourth stepped portions 4113A, 4113B, 4113C, and 4113D of the core plate 411 may be disposed in an order to have a two-directional symmetrical structure.

In addition, in the case of the 6p9s motor, since the vibration direction is formed to be inclined in three directions in a triangular shape as in FIG. 7C, the first to fourth stepped portions 4113A, 4113B, 4113C, and 4113D of the core plate 411 may be disposed in an order to have a three-directional symmetrical structure.

In addition, in the case of the 8p12s motor, since the vibration direction of the motor is formed to be inclined in four directions in a rhombic shape, the first to fourth stepped portions 4113A, 4113B, 4113C, and 4113D of the core plate 411 may be disposed in an order to have a four-directional symmetrical structure.

The plurality of core plates 411 are stacked in a state in which the plurality of core plates 411 rotate by a predetermined angle with respect to the adjacent core plate 411. In this case, in a case in which the number of pockets disposed in the core plate 411 is n, the core plate 411 may rotate by 360/n° in the axial direction with respect to another core plate stacked thereon. For example, in a case in which the number of the pockets 410P is ten as in FIG. 3, the core plates 411 are stacked in a state in which each of the core plates 411 rotates by 36° in the axial direction.

In this case, the first stepped portion 4113A and the third stepped portion 4113C may be disposed with the second stepped portion 4113B or the fourth stepped portion 4113D interposed therebetween in the axial direction. That is, in one pocket 410P, the first stepped portion 4113A and the third stepped portion 4113C are not disposed adjacent to each other in the axial direction.

Figure 8:
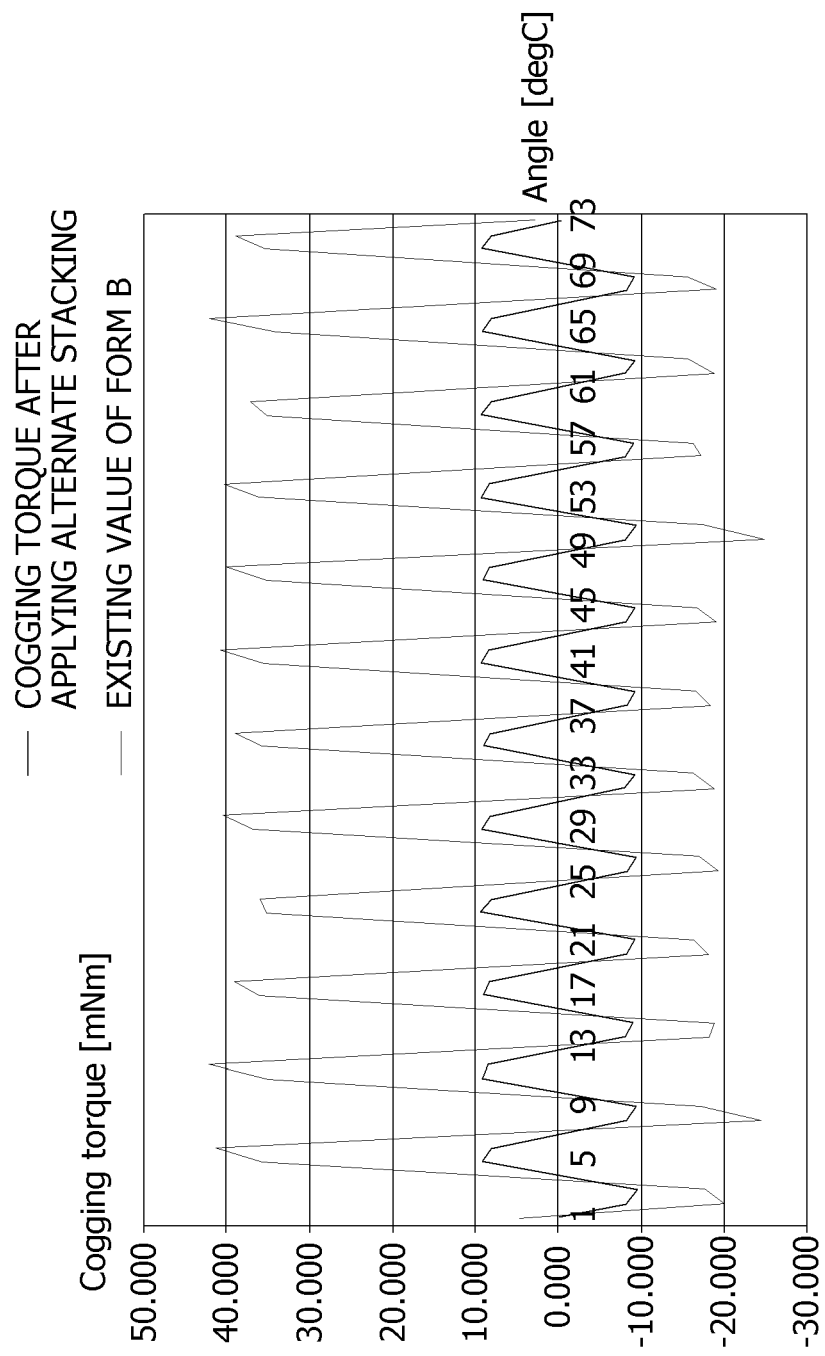
FIG. 8 is a graph showing cogging torque values according to a rotation angle of a conventional motor and a rotation angle of the motor according to the embodiment of the present invention.

FIG. 8 is a graph showing cogging torque values according to a rotation angle of a conventional spoke-type motor of the present invention and a rotation angle of the motor according to the embodiment.

Referring to the graph of FIG. 8, the conventional spoke-type motor has a cogging torque value of about −20 mNm to 40 mNm according to a change in rotation angle. Conversely, the motor according to the embodiment of the present invention has a cogging torque value of about −10 mNm to 10 mNm according to a change in rotation angle.

That is, the motor according to the present invention can variously implement shapes of the stepped portions overlapping the pocket of the core plate so as to reduce a cogging torque while the motor having a high magnetic flux density is driven. In addition, since an effect of a skew angle is provided, a cost for the skew angle in manufacturing the rotor can be reduced, and thus, the low-cost and high-efficiency motor can be provided.

As described above, the embodiments of the present invention have been described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

| REFERENCE NUMERALS | |
|---|---|
| 1: MOTOR | 100: HOUSING |
| 200: COVER | 300: STATOR |
| 310: STATOR CORE | 320: COIL |
| 330: INSULATOR | 400: ROTOR |
| 410: ROTOR CORE | 410P: POCKET |
| 411: CORE PLATE | 4111: CENTER PART |
| 4112: RADIAL PART | 4113: STEPPED PORTION |
| 4114: PROTRUSION | 420: MAGNET |
| 500: SHAFT | 600: BUSBAR |
| 700: SENSOR PART | |

The invention claimed is:

1. A motor comprising:
a shaft;
a rotor coupled to the shaft; and
a stator disposed outside the rotor,
wherein the rotor includes a rotor core, which has a plurality of pockets radially formed around the shaft, and magnets inserted into the pockets,
wherein the rotor core includes a plurality of core plates stacked in an axial direction,
wherein each core plate includes a center part and a plurality of radial parts connected to the center part,
wherein each of the plurality of radial parts includes surfaces forming the pocket and a plurality of stepped portions having a step,
wherein, in at least one of the stepped portions, a protrusion protrudes from one surface, which forms the pocket, of the radial part and a portion, which faces the protrusion, of the other surface is recessed,
wherein the plurality of stepped portions include at least two of a first stepped portion, a second stepped portion, a third stepped portion, and a fourth stepped portion, which have different shapes,
wherein, in the first stepped portion, one side of the radial part and the pocket overlap in a radial direction,
wherein, in the second stepped portion, both sides of the radial part and the pocket overlap in the radial direction,
wherein, in the third stepped portion, the other side of the radial part and the pocket overlap in the radial direction, and
wherein, in the fourth stepped portion, the radial part and the pocket do not overlap in the radial direction.

2. The motor of claim 1, wherein:
the number of the pockets is n; and
one core plate is rotated by 360/n° with respect to another core plate stacked thereon in the axial direction.

3. The motor of claim 2, wherein at least one of the stepped portions has a different shape from another of the stepped portions,
wherein the shapes of the stepped portions of the stacked core plates are different or the same in the axial direction.

4. The motor of claim 1, wherein, in the first stepped portion:
a protrusion protrudes from one surface, which forms the pocket, of the radial part; and
a portion, which faces the protrusion, of the other surface is recessed.

5. The motor of claim 1, wherein, in the second stepped portion, protrusions protrude from one surface and the other surface, which form the pocket, of the radial part.

6. The motor of claim 5, wherein the protrusions protruding from the one surface and the other surface, which form the pocket, of the radial part are spaced apart from each other.

7. The motor of claim 1, wherein, in the third stepped portion:
one surface, which forms the pocket, of the radial part is recessed; and
a protrusion protrudes from a portion, which faces a recessed position, of the other surface.

8. The motor of claim 1, wherein, in the fourth stepped portion, one surface and the other surface, which form the pocket, of the radial part are recessed.

9. A motor comprising:
a shaft;
a rotor coupled to the shaft; and
a stator disposed outside the rotor,
wherein the rotor includes a rotor core, which has a plurality of pockets radially formed around the shaft, and magnets inserted into the pockets,
wherein the rotor core includes a plurality of core plates stacked in an axial direction,
wherein each core plate includes a center part and a plurality of radial parts connected to the center part,
wherein each of the plurality of radial parts includes surfaces forming the pocket and a plurality of stepped portions having a step,
wherein in at least one of the stepped portions, a protrusion protrudes from one surface, which forms the pocket, of the radial part and a portion, which faces the protrusion, of the other surface is recessed,
wherein the plurality of stepped portions include at least two of a first stepped portion, a second stepped portion, a third stepped portion, and a fourth stepped portion, which have different shapes, and
wherein the second stepped portion or the fourth stepped portion is disposed between the first stepped portion and the third stepped portion, which are spaced apart from each other in a circumferential direction.

10. A motor comprising:
a shaft;
a rotor coupled to the shaft; and
a stator disposed outside the rotor, wherein the rotor includes a rotor core, which has a plurality of pockets radially formed around the shaft, and magnets inserted into the pockets, wherein the rotor core includes a plurality of core plates stacked in an axial direction, wherein each core plate includes a center part and a plurality of radial parts connected to the center part, wherein each of the plurality of radial parts includes surfaces foil ling the pocket and a plurality of stepped portions having a step, wherein, in at least one of the stepped portions, a protrusion protrudes from one surface, which forms the pocket, of the radial part and a portion, which faces the protrusion, of the other surface is recessed, wherein the plurality of stepped portions include at least two of a first stepped portion, a second stepped portion, a third stepped portion, and a fourth stepped portion, which have different shapes, and wherein the second stepped portion or the fourth stepped portion is disposed between the first stepped portion and the third stepped portion, which are spaced apart from each other in the axial direction.

11. A motor comprising:
a shaft;
a rotor coupled to the shaft; and
a stator disposed outside the rotor, wherein the rotor includes a rotor core, which has a plurality of pockets with pocket openings are radially formed around the shaft, and magnets inserted into the pockets, the rotor core formed of a plurality of core plates stacked in an axial direction, and wherein the pocket openings are formed in at least two or more shapes.

12. The motor of claim 11, wherein each of the pocket openings of adjacent pockets is formed in different shapes.

13. The motor of claim 11, wherein the pocket openings of the four adjacent the pockets have different shapes.

14. The motor of claim 11, wherein the core plate includes a center part a plurality of radial parts connected to the center part, wherein each of the plurality of radial parts includes surfaces forming the pocket and the plurality of stepped portion having a step, and wherein, in at least one of the stepped portions, a protrusion protrudes from one surface, which forms the pocket, of the radial part and a portion, which faces the protrusion, of the other surface is recessed.

15. The motor of claim 14, wherein some of the plurality of stepped portions include a protrusion protrudes from one surface, which forms the pocket of the radial portion, and others of the plurality of stepped portions do not include the protrusion.

16. The motor of claim 11, wherein the number of the pockets is n, and wherein one core plate is rotated by 360/n° with respect to another core plate stacked thereon in the axial direction.

17. The motor of claim 14, wherein the shapes of the stepped portions of the stacked core plates are different or the same in the axial direction.

18. The motor of claim 11, wherein the plurality of stepped portions include at least two of a first stepped portion, a second stepped portion, a third stepped portion, and a fourth stepped portion, which have different shapes, wherein, in the first stepped portion, one side of the radial part and the pocket overlap in a radial direction, wherein, in the second stepped portion, both sides of the radial part and the pocket overlap in the radial direction, wherein, in the third stepped portion, the other side of the radial part and the pocket overlap in the radial direction, and wherein, in the fourth stepped portion, the radial part and the pocket do not overlap in the radial direction.

19. The motor of claim 18, wherein, in the first stepped portion:

a protrusion protrudes from one surface, which forms the pocket, of the radial part; and a portion, which faces the protrusion, of the other surface is recessed.

20. The motor of claim 18, wherein, in the second stepped portion, protrusions protrude from one surface and the other surface, which form the pocket, of the radial part.

* * * * *